United States Patent [19]
Jones et al.

[11] Patent Number: 5,946,372
[45] Date of Patent: Aug. 31, 1999

[54] APPARATUS AND METHOD FOR TESTING DIGITAL COMMUNICATIONS CIRCUITS

[75] Inventors: William R. Jones, St. Louis, Mo.; Joe R. Luna, Houston; Rafael Ruiz, Spring, both of Tex.

[73] Assignee: Southwestern Bell Telephone Company, San Antonio, Tex.

[21] Appl. No.: 08/841,665

[22] Filed: Apr. 30, 1997

[51] Int. Cl.$^6$ .............................. H04M 1/24; H04M 3/08; H04M 3/22

[52] U.S. Cl. .................................. 379/1; 379/10; 379/29; 379/32

[58] Field of Search ............................... 379/1, 9–10, 14, 379/15, 26, 27, 29, 34, 32

[56] References Cited

U.S. PATENT DOCUMENTS

| | | | |
|---|---|---|---|
| 5,687,212 | 11/1997 | Kinser, Jr. et al. | 379/34 |
| 5,699,402 | 12/1997 | Bauer et al. | 379/26 |
| 5,774,530 | 6/1998 | Montgomery et al. | 379/34 |
| 5,790,633 | 8/1998 | Kinser, Jr. et al. | 379/34 |
| 5,790,634 | 8/1998 | Kinser, Jr. et al. | 379/34 |

*Primary Examiner*—Curtis A. Kuntz
*Assistant Examiner*—Binh K. Tieu
*Attorney, Agent, or Firm*—Greenblum & Bernstein, P.L.C.

[57] ABSTRACT

An apparatus and method are disclosed for remotely testing communications circuits, such as digital communications circuits for telephony-based services. According to the disclosed apparatus and method, status or history information related to the communications circuits is received from a tracking system. A control system is provided which manages testing of the communications circuits, and a database is provided which stores data associated with the communications circuits. Further, a testing system which performs a test operation or a predetermined sequence of tests on the communications circuits and determines a condition of the tested circuit(s), and a notification system which notifies service center personnel of the condition of the tested circuit are also provided. Information is received from the tracking system and utilized to extract a list of the communication circuits to be tested, which are stored in the database. The controlling system may access the database and manage the testing system to perform the test operation or predetermined sequence of tests and to notify service center personnel.

26 Claims, 7 Drawing Sheets

FIG. 8

APPARATUS AND METHOD FOR TESTING DIGITAL COMMUNICATIONS CIRCUITS

BACKGROUND OF THE INVENTION

1. Field of the Invention

The present invention generally relates to the field of telecommunications. More particularly, the present invention relates to a management system or tool for remotely testing circuits, such as digital communications circuits, in a telecommunications network environment.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Advanced Interactive eXecutive (AIX)
Dataphone Digital Service (DDS)
Digital Service, Level 1 (DS-1)
Hekimian Command Language Interpreter (HCLI)
High Level Language Application Programing Interface (HLLAPI)
Internet Protocol (IP)
Local Area Network (LAN)
Local Access and Transport Area (LATA)
Manager Scratch Pad (MSP)
Office Channel Unit (OCU)
Online Query System (OQS)
Operational Support System (OSS)
OSS Circuit History (OSSCHI)
OSS History Measurement Data (OSSHMD)
OSS Order Information (OSSOI)
Service Code (SVC)
System Network Architecture (SNA)
Special Service Center name (SSC)
Transmission Control Protocol/Internet Protocol (TCP/IP)
Work Force and Administration (WFA)
Work Force and Administration-Control (WFA/C)

BACKGROUND AND RELEVANT INFORMATION

Recently, many new telephony-based services, such as video conferencing, real-time video on-demand, etc., that have intensive or high data rate requirements are being made available to subscribers of digital services. Digital circuits, such as circuits with Dataphone Digital Service (DDS) or Digital Service, Level 1 (DS1) capabilities, are often used to implement such services, because analog telephone lines are unable to provide the data rates necessary to implement such services. These new services have created a higher demand for digital telephone lines, and telephone service providers have developed many tools to manage and troubleshoot digital circuits in need of repair. However, these tools have been designed to troubleshoot and correct faulty digital circuits after a customer's service has been interrupted, thus creating service outages. As a result, customers are experiencing service outages and must wait for service repair personnel to correct the problem.

While prior tools or systems have provided service personnel with the capability to repair digital circuits after the customer has reported a problem, such past attempts have not determined faults in new digital circuits prior to a customer detecting and reporting a problem to repair centers. In particular, prior attempts have not provided a mechanism for proactively testing newly installed digital circuits (i.e., post-provisioned circuits) to verify that the circuits are operational before they are actually used by a customer or placed "on-line". Past attempts have also failed to notify service personnel of faults in digital circuits prior to customer notification through an established mechanism.

Such features would be highly desirable to providers of digital telephony services, such as regional telephone companies, that desire an apparatus or method for testing and determining digital circuit faults prior to a customer's use of the digital circuit. Such features would also be beneficial to provide a process by which the number of new circuit failures could be reduced and customer satisfaction improved.

OBJECTS AND SUMMARY OF THE PRESENT INVENTION

In view of the above, the present invention, through one or more of its various aspects and/or embodiments is presented to accomplish one or more objectives and advantages, such as those noted below.

A general object of the present invention is to provide an apparatus and method for testing customer or subscriber communications circuits within a telecommunications services environment. The communications circuits that are tested may comprise, for example, digital communications circuits.

Further, an object of the invention is to provide an apparatus and method that reduces new digital communications circuit failures, by proactively identifying and correcting faulty conditions in equipment and facilities.

Another object of the invention is to remotely and non-intrusively access customer or subscriber circuits to determine whether a customer signal is detected and, if so, indicate when the circuit is in use such that no further circuit testing is performed.

Yet another object of the invention is to provide an apparatus and method for testing new communications circuits, such that user-specified test parameters are automatically invoked for new customer or subscriber circuits determined not to be in use or placed "on-line".

Still another object of the invention is to provide an apparatus and method for testing communications circuits, such as digital communications circuits, that notifies of faults associated with a digital circuit through the utilization of, for example, Work Force and Administration-Control (WFA/C).

Another object of the invention is to notify special services center personnel with the testing results, such that faults associated with newly installed digital circuits are expeditiously resolved and customer awareness of the faults is minimized.

Yet another object of the invention is to provide an apparatus and method for testing digital circuits that periodically tests newly installed digital circuits from when the service is installed until the service is placed "on-line" by the customer.

Accordingly, the present invention throughout its various features and aspects is designed to test newly installed digital circuits within a telecommunications or special services environment. In accordance with an aspect of the invention, a system is provided which remotely tests a communications circuit. The system receives status information related to the communications circuit from a tracking system and outputs circuit condition information related to the communications circuit. The system comprises a control system which controls the system, a database which stores circuit information associated with the communications circuit, a testing host which performs a test operation or sequence of test operations on the communications circuit, the testing host providing a test completion indicator to the control system, and a notification system which provides notification of the circuit information to, for example, service center personnel. The control system receives the information from the tracking system and may extract a list of circuits to be tested by the testing system, and upon receipt of a test completion indicator, the control system may instruct the notification system to notify service center personnel of the circuit information or result of the test.

According to another feature of the present invention, the list of the communications circuits and the circuit information for each of the communications circuits is stored in the database, and the control system accesses the database and transfers the communications circuit to be tested to the testing host.

According to yet another feature of the present invention, the test sequence is inhibited if the control system determines that a customer has accessed or disconnected the communications circuit and the database is updated to remove the communications circuit, whereby a log file at a service center that contains information related to the communication circuit may be updated to include the circuit information.

According to a further feature, if the test completion indicator for the communications circuit indicates that the test sequence has not been completed, the control system retries the test sequence a predetermined number of times, and if the control system has retried the testing sequence the predetermined number of times, the database is updated to remove the communications circuit and the log file at the service center is updated to include the circuit information.

According to another feature of the invention, the circuit information may include at least one of: the Circuit Level Order; the Special Service Center name; the WFA region in which the test was performed; the circuit ID format; the circuit identification; a time value of the date when the control system received the circuit; a time of the last test access; a time of the last completed test; a time of a circuit determined to be in use; and results of the last test performed on the circuit.

The control system may control the system according to a configuration file that includes information relating to at least one of: the number of servers, the platform to run on, a starting time, an ending time, the type of testing, whether the tracking system should generate a trouble report in response to a detected fault, a WFA-categorized type of report, a work pool to place a function level code, and notification parameters.

The control system may comprise a management module which manages events occurring within the system and communicates with the database and the tracking system, a parse module which extracts circuit related information provided on input from the tracking system and communicates the circuit information to the management system, and a server module which communicates with the testing system and communications a test completion indicator to the management module. The server module may perform the test sequence which is executed on the testing host, and the communications circuits may comprise digital telecommunications or telephony-based circuits.

According to another feature of the invention, the list of the communications circuits and the circuit information for each of the communications circuits may be stored in the database, and the management module may access the database and transfers the communications circuit to be tested to the testing host.

According to yet another feature, the test sequence is inhibited if the server module determines that a customer has accessed or disconnected the communications circuit, whereby the database is updated to remove the communications circuit, and a log file at a service center that contains information related to the communication circuit is updated to include the circuit information.

According to a further feature of the invention, if the test completion indicator for the communications circuit indicates that the test sequence has not completed, the server module retries the test sequence a predetermined number of times, and if the server module has retried the testing sequence the predetermined number of times, the database is updated to remove the communications circuit and the log file at the service center is updated to include the circuit information.

The various components of the invention may be implemented in a number of ways. For example, the testing host comprises a REACT 2001 Remote Test OSS, the tracking system may comprise a Work Force Administration OSS, and the communications circuits may comprise DDS or DS1 equipped circuits.

According to yet another feature of the present invention, the notification system may notify service center personnel by at least one of electronic mail, pager and trouble tickets issued by the tracking system.

In accordance with another aspect of the invention, a method is provided for testing a communications circuit with a system capable of remotely testing communications circuits, the system comprises a testing system, a database and a notification system. The method may comprise: receiving a list of communications circuits to be tested by the testing system, the being provided as input from a tracking system, storing circuit information associated with each communications circuit to be tested in the database; testing, based on the list received from the tracking system, each communications circuit to be tested using a test operation performed by said testing system; determining the circuit information based on the test operation; providing a test completion indicator; and notifying service center personnel of the circuit information upon receipt of the test completion indicator.

According to another feature, the step of testing may further comprise inhibiting the test operation if a customer has accessed or disconnected the communications circuit, updating the database to remove the communications circuit, and updating a log file at a service center that contains information related to the communication circuit to include the circuit information.

According to yet another feature, the step of testing may further comprise retrying the test operation a predetermined number of time if the test completion indicator for the communications circuit indicates that the test operation has not completed, and updating the database to remove the communications circuit if the testing system has retried the test operation the predetermined number of times.

According to a further feature, the step of notifying may include sending notification to service center personnel by electronic mail, pager and/or trouble tickets issued by the tracking system.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The present invention, through its various features and aspects, provides a tool or application for testing of newly installed communications circuits, such as digital communications circuits, and notifying special service centers or service personnel of circuit faults requiring service resolution or repair. The digital circuits may comprise various type of communications circuits, such as circuits equipped with DDS or DS 1 (or higher level service) capabilities, for providing telephony-based services to customers or subscribers. Although the embodiments and features of the present invention are disclosed herein with respect to testing of particular digital communications circuits, such as DDS and DS1 circuits, the present invention is not limited to such embodiments and may be applied to other circuits. For example, the present invention may be implemented to test other types of digital circuits or to test analog circuits.

In order to prevent new circuit failures, the present invention may access newly installed digital circuits on a periodic basis, such as during the evening of each day or other periods of probable low utilization. Upon accessing the circuit, the present invention determines if the customer is using the digital service by performing a monitoring test. If the circuit is determined to be in use by the customer, it is removed from a list of circuits to be tested so that it is not tested again. If the present invention determines that the circuit is not in use by the customer or placed on-line, then the circuit may be non-intrusively tested to determine if the circuit will work properly when the customer begins to use it. Upon determination of a fault, the present invention may notify personnel at a special service center of the circuit fault condition via E-mail and/or other suitable forms of notification. For example, an internal trouble ticket may be generated by, for example, a Work Force and Administration-Control (WFA/C) host that the circuit has a problem that should be resolved. In addition the notification may comprise an alphanumeric or digital page, an X-Windows terminal display or message, and/or other types of electronic messages. The notification may contain various information, including: a circuit identification; trouble identification; date and time received; service type; customer name; current status and the initials of the technician involved in the service restoration effort.

Referring now to the accompanying drawings, a detailed description of the preferred embodiments, features and aspects of the present invention will be provided.

Figure 1:
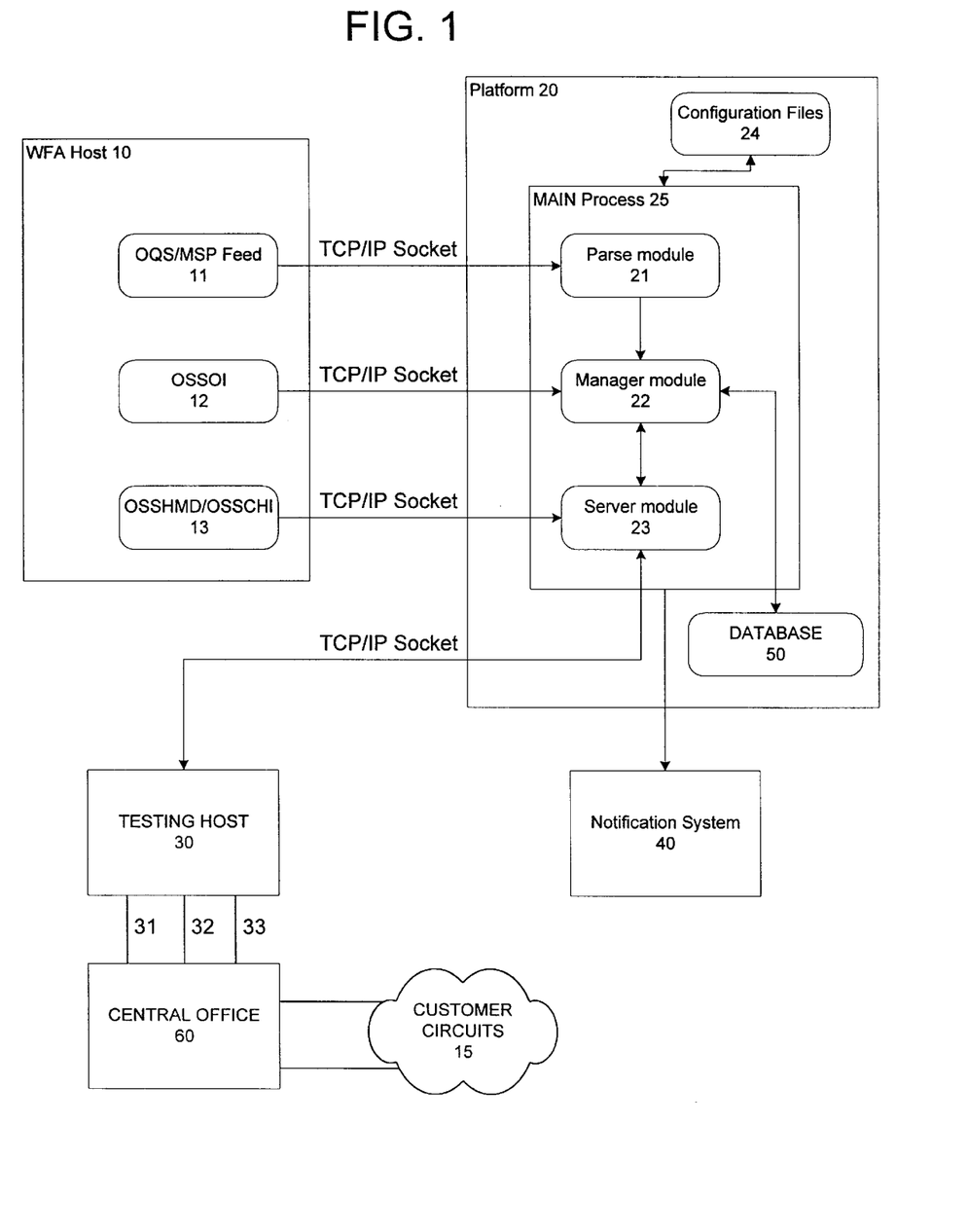
FIG. 1 illustrates, in block diagram form, an exemplary system architecture in which the present invention may be implemented.

The features and aspects of the present invention may be implemented by any suitable combination of hardware, software and/or firmware. An exemplary implementation of the present invention is illustrated in FIG. 1. According to the embodiment of FIG. 1, the present invention may comprise a MAIN process 25 that operates on a microprocessor-based computer, mainframe, or client/server platform 20. The platform 20 may include a UNIX-based operating system or other operating system capable of multi-tasking (e.g., time-slice or preemptive) operations. By way of a non-limiting example, the platform 20 may be implemented with an IBM RS6000 workstation running an Advanced Interactive eXecutive (AIX) V3.2.5 or greater operating system. Such a workstation may exemplify a client connected to a server via a local area network (LAN) or other suitable network infrastructure (not shown) to access data and program files. In addition, platform 20 may include sufficient memory storage capacity to maintain all necessary programs and files. For example, a minimum of 10 MB of disk storage may be provided to store the program files of the present invention, with the storage capacity being adjustable based on the size and number of programs and files to be maintained. The present invention, however, is not limited to the implementation illustrated in FIG. 1, and other arrangements and system implementations may be provided. For example, the platform 20 may be interconnected (e.g., through a LAN or another type of network architecture) to other mainframes and client/servers; and, thus, the executable components of the MAIN process 25 may be distributed to more than one mainframe, client/server or other computer-based systems.

Ticket tracking on troubled circuits 15 or special services, and trouble report information may be provided through a ticket reporting and tracking system 10. In addition, the ticket reporting and tracking system 10 may also maintain information regarding newly installed communications circuits 15. Communications circuits 15 may comprise circuits or equipment with DDS or DS-1 (or higher level) capabilities. As shown in FIG. 1, the communications circuits 15 may be connected to a Central Office 60 which provides, for example, circuit-switched telephone communications. The ticket reporting and tracking system 10 may run a daily (or other periodic process) to retrieve a list of all circuits 15 which were installed within a predetermined period (,e.g., one day) specified by designated special service centers (not shown) throughout a predefined telecommunications network operating area. Additionally, customers or subscribers experiencing trouble with their subscribed or special service (e.g., a private line service or other telecommunication service) may contact personnel at the designated special service centers. A trouble report or ticket may then be generated by the service center personnel through the use of the ticket reporting and tracking system 10. Service center personnel may access and transfer ticket information to the ticket reporting and tracking system 10 through the use of a modem, TCP/IP connectivity and/or other components providing system connectivity. The trouble report information from the ticket reporting and tracking system 10 may also be provided to the MAIN process 25 via a TCP/IP socket or other suitable communications systems.

By way of a non-limiting example, the ticket reporting and tracking system 10 may comprise a Work Force and Administration (WFA) or Work Force and Administration—Control (WFA/C) Operational Support System (OSS), which is a software-based product that is available from Bell Communications Research (Bellcore), Murray Hill, N.J. For information concerning WFA/C, see "Work Force and Administration—WFA Control", Bellcore Practice BR190-513-323, which is expressly incorporated herein by reference in its entirety. The WFA Host of the ticket reporting and tracking system 10 may reside as software on a microprocessor-based computer or mainframe, such as an IBM 3270 mainframe or another type of hardware platform. Although one WFA Host 10 is shown in FIG. 1, additional WFA Hosts and systems 10 may be provided for reporting and tracking customer trouble tickets and newly installed circuits 15. Further, a TCP/IP socket may be provided between the WFA Host of each system 10 and the platform 20. The connection may be implemented by emulating an IBM 3270 printer port connection and providing a suitable communication network or connection (such as a LAN) between the platform 20 and the WFA Host 10. Trouble report information and newly installed circuit information may be sent by the WFA Host on a periodic basis (e.g., daily) to the MAIN process 25 via the TCP/IP socket.

According to an aspect of the invention, the trouble report and tracking information may be provided to the MAIN process 25 by an On-line Query System (OQS) and/or Manager Scratch Pad (MSP) feed 11 from the WFA Host of system 10. As illustrated in FIG. 1, the MAIN process 25 may comprise or access various configuration files 24, executable files (e.g., parse module 21, manager module 22, and server module 23) and database files (stored in database 50) for filtering, managing, sending/receiving testing procedures, and storing information related to the newly installed circuits and circuits that have been determined to be faulty. The executable files may be programmed with a high level language (e.g., C or C++) that is compatible with the operating system of the platform 20. As noted above, the executable components (i.e., parse module 21, manager module 22, and server module 23) of the MAIN process 25 may be distributed to more than one platform 20 and may run independently of one another. Further, the interface between the MAIN process 25 and the ticket reporting and tracking system 10 may be programed using the High Level Language Application Programming Interface (HLLAPI) Systems Network Architecture (SNA) software, such as TPS 3270 HLLAPI SNA software available from IBM Corp. The configuration files 24 may include configuration settings for the manager module 22, testing parameters, and special service center notification parameters. The configuration files, executable files and database files will be described in greater detail hereinafter. As will be described herein, the OQS report file containing newly installed circuits 15 may be sent from the WFA Host of the ticket reporting and tracking system 10 to the parse module of the MAIN process 25 at predefined intervals (e.g., daily). The interval may be predefined at the discretion of a system administrator, and may be set in a configuration file.

In preferred embodiment of the present invention, the configuration files 24 comprise three configuration files (manager.cfg, time.cfg and<special service centers>.cfg) that are provided to configure the manager module 22, the testing times, and the special service centers. The manager module configuration file (e.g., manager.cfg) may be a flat file (e.g., an ASCII file) provided to configure the number of server modules 23 that should be executed and on which platforms 20 the server modules 23 should be executed. An exemplary format of the manager module configuration file may comprise:

<number of servers> <platform to run on>
where the<number of servers> field is an integer value, and the <platform to run on> field identifies a particular platform (e.g., by an IP address).

The testing time configuration file (e.g., time.cfg) may be a flat file provided to specify the time at which the manager module 22 is to start testing and to specify a time to stop testing. An exemplary format of the testing time configuration file may comprise:

<starting time> <ending time>
where the <starting time> field indicates a time to start the manager module 22, and the <ending time> field indicates a time to stop testing. The times are preferably in a 24-hour format with both the hours and minutes being included for each time indicated.

The special service center configuration file (<special service center>.cfg) may be a flat file provided to determine which special service centers testing is to be performed, the type of WFA tickets to create (if any) and which service center personnel to notify (e.g., by e-mail) of the test results. The format and name of the special service center configuration file may vary by service center, and an exemplary format may be:

```

#       DS1 SECTION

TEST=DS1
CRITERIA=HAN
TICKETS=T
RPTTYPE=RS
TRBLTYPE=INV
FLC=HSL

#       DDS SECTION

TEST=DS1
CRITERIA=HAN
TICKETS=T
RPTTYPE=RS
TRBLTYPE=INV
FLC=HSL

#       MAIL SECTION

LOTUS:SYSTEM=/bin/rcp %s wj1849@houssc:~/hansel
LOTUS:SYSTEM=/bin/rcp %s wj1849@houssc2:~/hansel
DS1MAIL:/bin/mail rr7032%houmail@swgate1
DDSMAIL:/bin/mail rr7032%houmail@swgate1
DS1MAIL:/bin/mail hs5319%houmail@swgate1
DDSMAIL:/bin/mail hs5319%houmail@swgate1
DS1MAIL:/bin/mail jl4583%houmail@swgate1
DDSMAIL:/bin/mail jl4583%houmail@swgate1
```

In the exemplary special center configuration file above, three sections are defined to configure reporting of faults for DS1 and DDS circuits, generating of tickets, and notification of service center personnel. In the DS1 and DDS SECTIONS, TEST indicates the type of testing to be performed by a Testing Host 30 and reported to the special service center; CRITERIA indicates how (e.g., length of test, testing type) a service center is to run the testing; TICKETS indicates whether the WFA Host 10 should generate trouble tickets in response to a detected fault; RPTTYPE indicates the WFA-categorized type of report to generate; TRBLTYPE indicates a WFA detected input; and FLC indicates a work pool or group that a function level code is to be assigned. In the MAIL SECTION, UNIX environmental variables may be defined. For example, in the above-noted configuration file, the environmental variable in the MAIL SECTION define to which personnel E-mail is to be sent, and by what system (e.g., UNIX mail and LOTUS Notes).

It is noted that each of the three disclosed files of the configuration files 24 have been provided for exemplary purposes and each may contain information related to additional configurable parameters as necessary to implement the testing system of the present invention.

As shown in FIG. 1, a Testing Host 30 is provided to perform remote testing of digital and/or analog services (e.g., via private lines 31, modem 32 or TCP/IP connection 33 to a Central Office 60). The Testing Host 30 may perform tests such as bit error rate testing to the last loopable component in the network by accessing the circuits 15 at the Central Office 60. The Testing Host 30 is called by the server module 23 of the MAIN process 25. The server module 23 may communicate with the Testing Host 30 to indicate, for example, the type of test to be performed, and on which circuits 15 to performs such tests. The server module 23 may also communicate with the Testing Host 30 to send and receive testing-related data. As a non-limiting example of the Testing Host 30, a REACT 2001 Testing Operational Support System may be provided as the Testing Host 30, which is a product of Hekimian Laboratories, Inc., Rockville, Md.

According to another aspect of the invention, a Notification System 40 may be provided to notify service center personnel of faults in newly installed communications circuits 15 and error conditions encountered by the MAIN process 25. The notification may be in the form of an E-mail message, alphanumeric page or other electronic notification. The Notification System 40 is provided such that upon determination of a circuit fault, the appropriate service center personnel are notified for resolution of the fault. The E-mail message may contain, for example, a list of tested circuits, a list of circuits determined to have faults, and a list of circuits determined to have passed the testing process. The Notification System 40 may be called by the MAIN process 25 via the platform 20. In addition, the Notification System 40 may reside on the platform 20. When the notification comprises a digital page, the page may contain less information then that indicated above; and, thus, digital paging may require the personnel that was paged to seek other or more formal communication channels in order to gather all of the pertinent information. For example, a digital page may be limited to a notification that testing for all circuits has completed.

The Notification System 40 may be implemented with any suitable combination of hardware, software and/or firmware and be responsible for generating an alerting message or notification. To facilitate page notifications, the Notification System 40 may comprise a paging server or other suitable components for generating a page to specified management levels or personnel. In addition, the Notification System 40 may include a mail server, a network-based windowing system and other system software and components for generating E-mail messages and other types of notification. By way of a non-limiting example, a standard UNIX-based mail system (e.g., UNIX "mail") may be provided to send e-mail messages or the internal mail system of, for example, WFA may be used to send messages (in which case, the Notification System 40 may interface with one the WFA Hosts), and other commercially available messaging software may be used (such as Lotus Notes). In addition, printouts notifications may also be provided to personnel, and notification activity may be logged in the WFA Host of system 10 by the MAIN manager module 22 via TCP/IP socket connectivity and the MAIN process 25 (see, e.g., FIG. 1). By way of a non-limiting example, OMAIL (which is an internal mail process or function of WFA) of the WFA, Host of system 10 may be used to send notification to personnel and to printout alert messages at a designated printing center (not shown in FIG. 1).

A database 50 is provided to store and retrieve information related to the installed digital communications circuits 15. The database 50 may comprise a database table to store a record of all circuits 15 that are currently being tracked and tested by the MAIN process 25. This table would include, for example, circuits 15 that have been installed, but not yet used by customers. The table may also include, for example, error messages and disposition information related to the circuits 15 undergoing testing. The OQS report file containing newly installed circuits 15 may be used to populate the table after the OQS report is transferred to the MAIN process 25. Further, the results passed to the MAIN process 25 from the Testing Host 30 may also be used to populate the table.

An exemplary table structure may be as follows:

| Field Name | Format/Length |
| --- | --- |
| CLO | CHARACTER 12 |
| SSC | CHARACTER 11 |
| REGION | CHARACTER 8 |
| FMT | CHARACTER 1 |
| CKTID | CHARACTER 64 |
| LSUBMIT | INTEGER |
| LACCESS | INTEGER |
| LTESTED | INTEGER |
| LFRAME | INTEGER |
| RESULT | CHARACTER 64 |

In the exemplary database table structure indicated above, the CLO field contains the Circuit Level Order (from, for example, the WFA OQS feed 11) and may comprise a string of 12 characters; the SSC field contains the Special Service Center name and may comprise a string of 11 characters; the REGION filed contains the WFA region in which the test was performed and may comprise a string of 8 characters; the FMT field contains data related to the circuit ID format (e.g., S (serial) or C (carrier)) and may comprise a string of 1 characters; the CKTID field contains the circuit identification which identifies the circuit type (e.g., DDS or DS1) and may comprise a string of 64 characters; the LSUBMIT field contains an integer time value of the date when the control system first received the circuit to be tested; the LACCESS field contains an integer time value of the last test access; the LTESTED field contains an integer time value of the last completed test; the LFRAME field contains an integer time of when the circuit was determined to be in use; and the RESULT field contains the results of the last test performed on the circuit.

It is noted that the above database table structure has been provided for exemplary purposes only, and may contain fewer or additional fields or parameters for storing data related to the testing system of the present invention. As a non-limiting example, of the database 50, Informix Online Database Software, available from Informix Corp., Menlo Park, Calif., may be utilized to implement the database 50. In addition, although the database 50 is shown as residing on the same platform 20 as the MAIN process 25, the database 50 may be provided on a separate platform 20 (e.g., UNIX-based platform) than the platform for the MAIN process 25. In such a system, the database 50 may communicate to the MAIN process 25 via a LAN or other network infrastructure (e.g., a TCP/IP network).

An exemplary embodiment of the operations and functions of the parse module 21 of the MAIN process 25 is discussed below with reference to FIGS. 1 and 2.

The parse module 21 dissects and processes the data received from the OQS report into individual circuit records or Circuit Level Orders (CLO). OQS reports may be periodically received using a TCP/IP socket connection to the OQS/MSP feed 11 of the WFA Host 10 (see FIG. 1). The parse module 21 of the MAIN process 25 may be activated upon receipt of the OQS/MSP feed 11 using SNA HLLAPI calls, and may pre-filter non-circuit information and incorrectly formatted information in each line of the transmitted OQS report prior to transmitting the data to the manager module 22. For example, extraneous header information in the reports may be removed when filtering non-circuit information. Each OQS report received may be for a specific service center and may be uniquely identified by a Service Center name in the report. Further, the OQS report may include a list of all orders completed within a predefined interval (e.g., all circuits 15 completed as of yesterday if the predefined interval is one day). By way of a non-limiting example, the data structure transmitted to the manager module 22 from the parse module 21 may include the CLO (12 characters). The CLO may serve as a key (e.g., a unique identifier) that is used to retrieve information for the circuits 15 installed during the predefined interval. Other information may be provided in the data structure as necessary.

All parsed records may be sent to the manager module of the MAIN process 25. If the parse module and manager module are on different mainframes 20, then the parsed records may be sent via a TCP/IP socket connection between the components over a communication network (e.g., a LAN) or a suitable transmission link.

Figure 2:
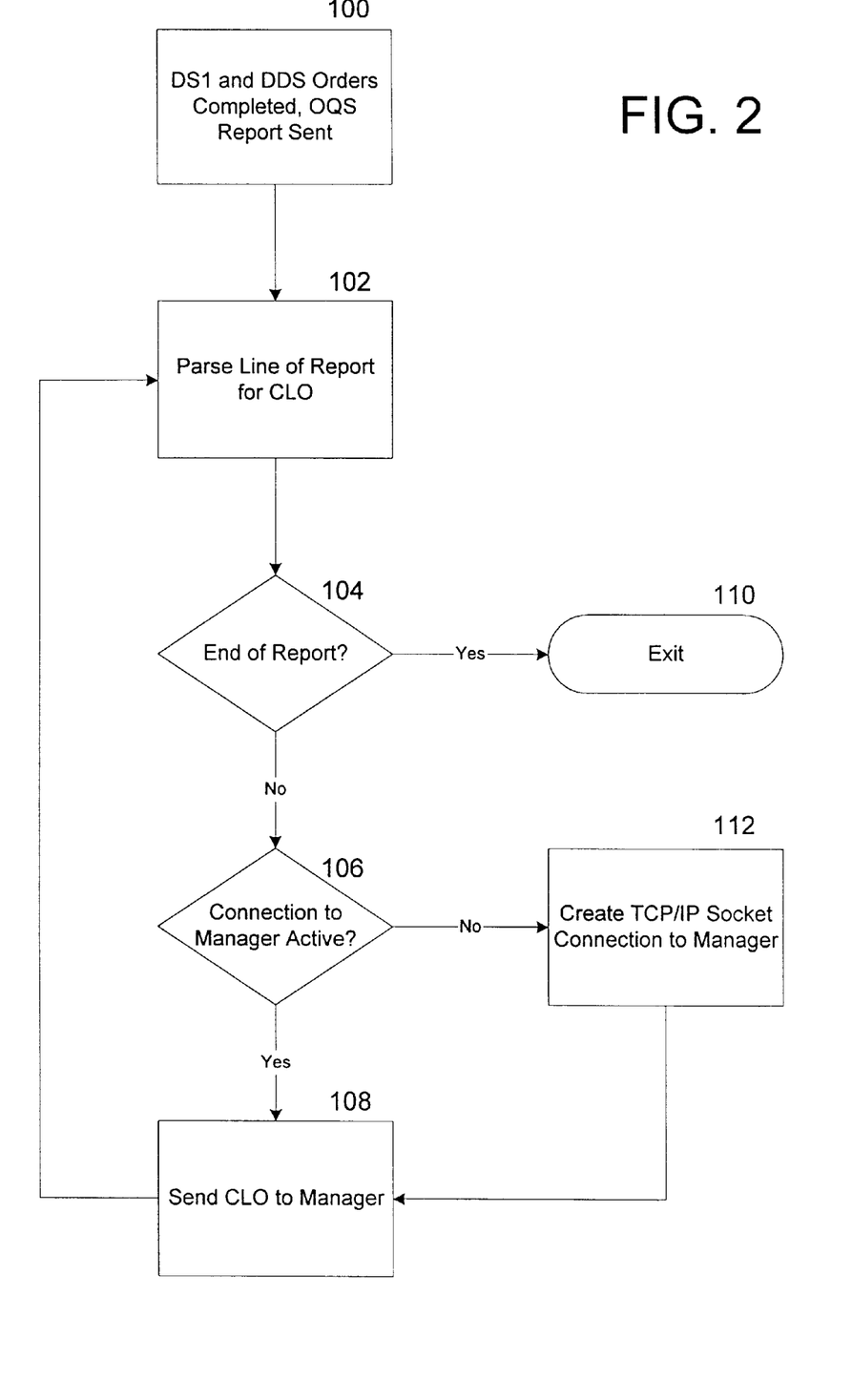
FIG. 2 is an exemplary flow chart of the processes and operations of a parse module of the present invention.

Referring now to FIG. 2, an exemplary functional and logic flow of the operations and functions related to the parse module 21 will now be described. At step 100, the completed communications circuits order, such as digital DS1 and DDS orders, are sent to the parse module 21 from the WFA Host OQS/MSP Feed 11 via the TCP/IP socket connection in the form of a raw or original OQS report. At step 102, the OQS report is parsed to strip off the extraneous information and to retrieve the Circuit Line Order (CLO). The OQS report may be parsed on a line-by-line basis for each CLO. After the CLO information is parsed, at step 104, the parse module 21 determines if the end of the OQS report has been reached. If the end of the report has been reached (i.e., no additional lines in the OQS report exist), then the parse module 21 exits the functional flow at step 110, thus completing its operations. If the end of the OQS report 11 has not been reached, the parse module 21 determines if the connection to the manager module 22 is active at step 106, and if so, sends the CLO data structure noted above to the manager module 22 at step 108. As noted above, the manager module 22 may reside on another platform 20 than the parse module 21. If the connection is not active, then the parse module 21 creates a TCP/IP socket connection to the manager module 22 at step 112, and sends the CLO data structure to the manager module 22 at step 108. The process then returns to step 102 to parse the next line in the O(OS report from the next CLO.

An exemplary embodiment of the operations and functions of the manager module 22 of the MAIN process 25 is discussed below with reference to FIGS. 1 and 3–6.

The manager module 22 receives parsed records from the parse module 21 (via e.g., a TCP/IP socket), stores and retrieves the received records from the database 50, manages times when testing is to occur, manages the server module 23, manages the service center test result files, and manages the distribution of the test results to the test centers. The manager module 22 may run separately from the parse module 21 and the server module 23 of the MAIN process 25. For system integrity, the records may be stored by the manager module 22 in both volatile memory and permanent memory of the platform 20. Accordingly, in the event of a system failure or a manager process restart, the records in permanent storage may be read back into the volatile memory for quicker processing. Other features may also be provided to maintain system integrity. For example, if the manager module 22 does not receive a circuit report from any service center for more than a predetermined period of time (e.g., one day), the manager module 22 may page an administrator with a warning message via the Notification System 40. The warning message may indicate that the data input process may have a problem. The paging or alerting criteria may be maintained within a special service center configuration file.

Each parsed circuit record received may be evaluated by the manager module 22 against a configuration file to determine if an alerting message or page should be transmitted. As noted-above, a configuration file may be provided for each service center or management level. The service center or management specified in the circuit record may be evaluated to determine which configuration file is to be accessed and queried. When it is determined that the time duration or other alerting criteria has been satisfied, the manager module 22 may request that notification be sent to the appropriate personnel via the Notification System 40.

According to an aspect of the present invention, the manager module 22 may be adapted to receive parsed records with CLOs from the parse module 21 at any time. The manager module 22 may be configured such that any CLOs received after testing has begun will not be processed until the next testing cycle begins (e.g., the next day). According to another aspect of the present invention, the manager module 22 is dormant, and is initiated to begin testing at a specified time set in, for example, the testing parameter configuration file. The testing will continue until a user-configurable stop time is reached. Once the manager module 22 starts-up, the manager module 22 may determine if there are any circuits 15 to be tested by extracting circuit testing information from the database 50. The extracted circuits are loaded into memory and are set-up for testing.

As noted above, the manager module 22 manages the server module 23 which performs the testing via the Testing Host 30. The manager module 22 utilizes a configurable number of the server modules 23 (from the manager module configuration file) to perform the actual testing of the circuits 15. The manager module 22 starts-up the server module 23 when the testing beings and shuts-down the server module 23 when the testing process ends. As noted above, more than one server module 23 may be utilized and the number of server modules 23 started may be user-configurable and specified in a manager module configuration file. According to an aspect of the present invention, the number of server modules that are utilized may be directly proportional to the number of concurrent tests to be performed or the number of Testing Hosts 30 that are present. More than one Testing Host 30 may be provided to facilitate testing of circuits according to predefined regions or geographic areas. If one of the server modules 23 exits abnormally, the manager module 22 will detect the absence of the server module 23 and start up another server module 23 to replace it.

Each server module 23 returns test results to manager module 22, which determines if the testing was executed through completion. If not, the manager module 22 may instruct the appropriate server module 23 to reschedule the test within a predetermined time frame, for example, forty-five minutes. In addition, the manager module 22 may instruct the appropriate server module 23 to retry the test a predetermined number of times, for example, five times. Both of these parameters may be user-configurable and located within the manger module configuration file. In accordance with yet another aspect of the invention, upon a successful completion of the testing sequence, or upon a total test failure, the circuit may be removed from the circuit list stored in the memory of manager module 22. When the server module 23 returns the test results to the manager module 22, the results may be sorted in accordance with circuit type (e.g., DDS or DS1). Further, the results may be transmitted to special service centers in accordance with a special service center configuration file via the Notification System 40 (e.g., via E-mail, electronic pager, etc.).

Figure 3:
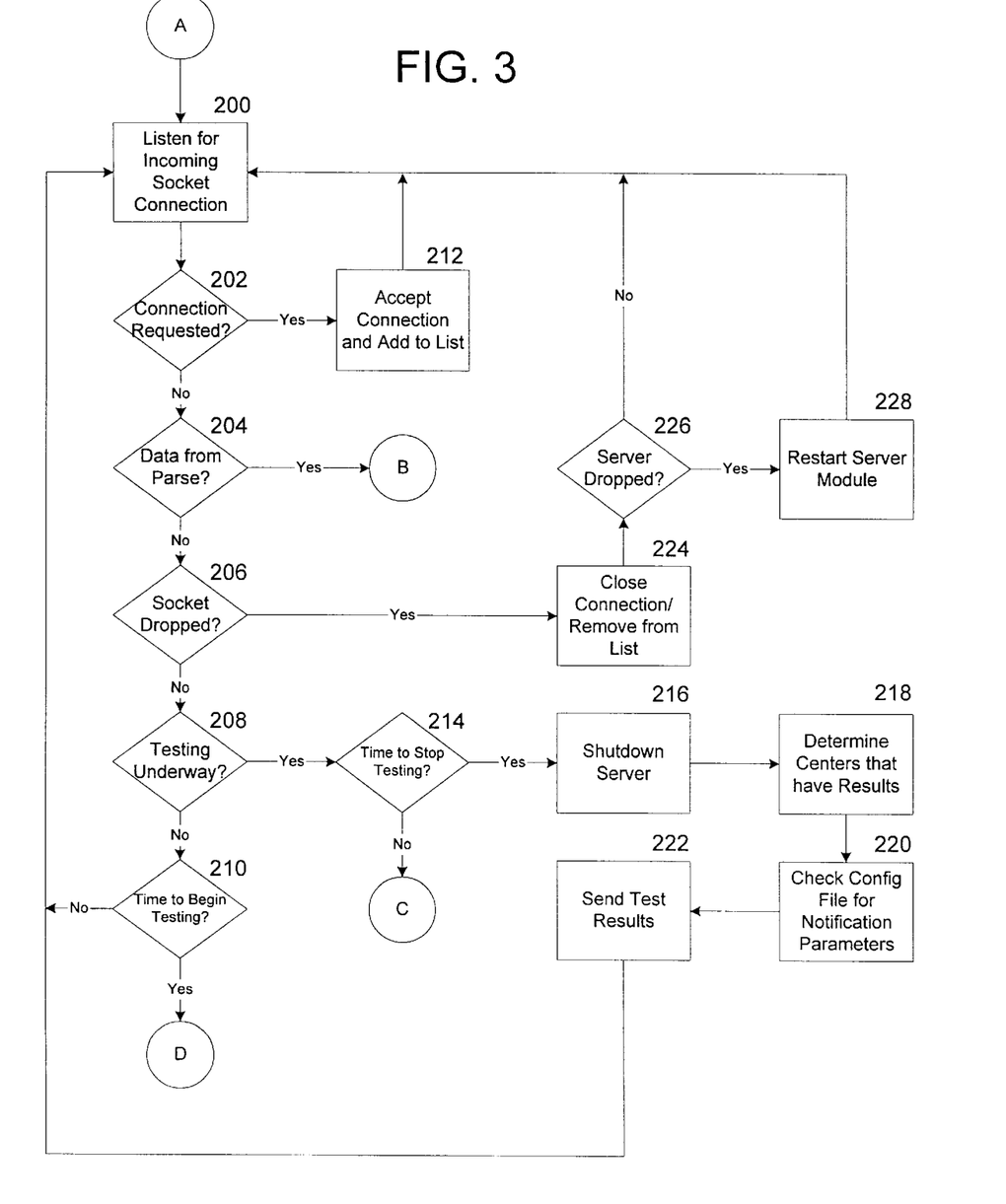
FIGS. 3–6 are exemplary flow charts of the processes and operations of a manager module of the present invention.

Referring now to FIG. 3, the manager module 22 loops through a process which includes steps 200, 202, 204, 206, 208 and 210 to execute the various functions of the manager module 22. At step 200 the manager module 22 waits for an incoming socket connection from the parse module 21, which sends parsed records to the manager module 22 (see step 108 in FIG. 2), or an incoming socket connection from the server module 23, which sends test completion and update information to the manager module 22 (see steps 342 or 346 in FIG. 8). At step 202 the manager module 22 determines whether a socket connection is being requested at step 200, and if so, then at step 212, the manager module 22 accepts the connection and adds the socket to the list of active connections. It is noted that steps 200 and 202 are determining if the socket connection is from a new, or previously deleted parse module 21 or server module 23 that is now attempting to communicate circuit or test data to the manager module 22. At step 204, the manager module 22 determines if the incoming data is from the parse module 21. If the data is from the parse module 21, then the logic flow proceeds to point B, shown in FIG. 4.

Figure 4:
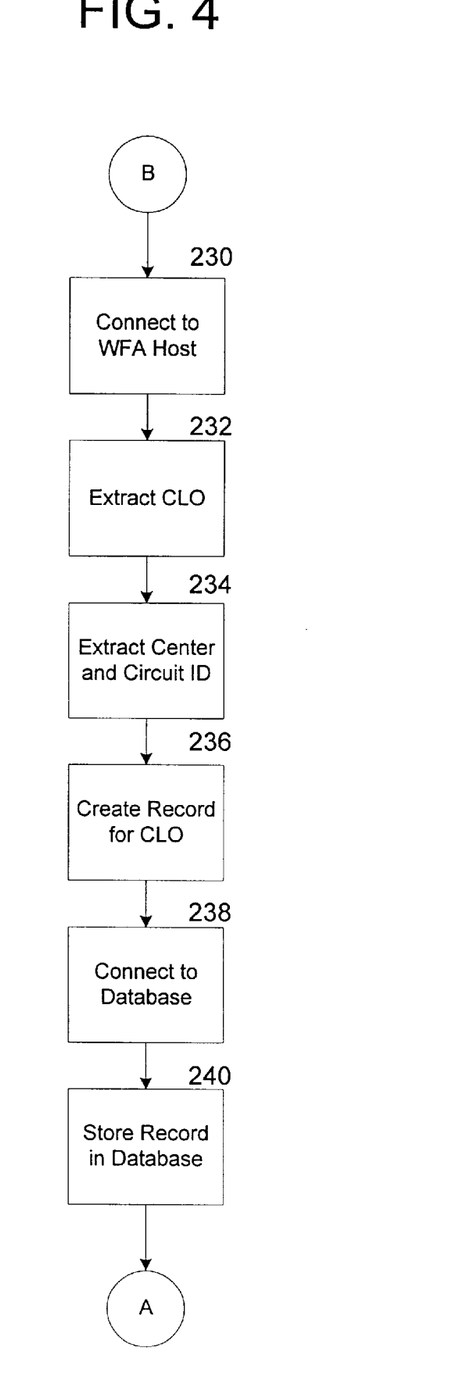

Referring to FIG. 4, at step 230, the manager module 22 connects to the WFA Host 10 via the TCP/IP socket connection. The socket connection may be provided using the above-mentioned TCP/IP SNA HLLAPI. At step 232 based on the present CLO sent from the parse module 21, the CLO is extracted from the OSS Order Information (OSSOI) screen data 12 of the WFA Host 10 using SNA HLLAPI calls. The service center name and circuit ID is parsed from the OSSOI screen 12 at step 234, and a database record is created containing the extracted CLO information at step 236. The manager module 22 performs steps 234 and 236 to verify that the CLOs parsed from the OQS report by the parse module 21 is accurate and complete. At step 238, the manager module 22 connects to the database 50 and stores the database record at step 240. Initially, database record may be created with the service center name, CLO, and circuit ID by the manager module 22. Thereafter, the date the test was submitted and the last test result (from the Testing Host 30) may be populated into the database record. After step 240, the logic flow then proceeds to point A and step 22 in FIG. 3, where the looping process continues.

Referring now to step 206 in FIG. 3, if at step 204 it is determined that the data is not from the parse module 21, then the manager module 22 determines if the socket connection has been dropped by one of the modules (e.g, parse module 21 of server module 23), and if so, the manager module 22 drops the connection from the active list at step 244. It is noted that the parse module 21 may maintain a socket connection with the manager module 22 only when it is sending data. After the parse module 21 has completed sending data, the connection is dropped by the parse module 21. However, at step 226, if the manager module 22 determines that the server module 23 has dropped a socket connection, then the server module 22 is restarted at step 228 where the process returns to step 200 to continue the loop process. In accordance with the an aspect of the invention, each of the server modules 23 may maintain a socket connection with the manager module 22 throughout the testing process. Thus, if a connection is dropped by the server module 23, the manager module 22 identifies this situation as "erroneous" and will attempt to restart the server module 23.

If at step 206 it is determined that a socket has not been dropped (i.e., the socket connection is to a server module 23), then at step 208, it is determined whether testing by the Testing Host 30 is underway. It testing is performed, then the manager module 22 determines at step 214 if it is time to stop testing, by comparing a current time with an end time set in the configuration files 24. If at step 214 it is not time to stop testing, then the logic flow jumps to point C and step 242 shown in FIG. 5, where it is determined at step 242 if the server module 23 has reported the circuit test results from an in-progress test. If the server module 23 has not reported the test, then at step 244, the manager module 22 determines if there are additional circuits 15 to be tested by the Testing Host 30. If there are no additional circuits 15 to be tested, then the logic flow returns to point A and step 200 in FIG. 3. If there are additional circuits 15 to be tested, then at step 246. the manager module 22 determines if there is a server module 23 available to send the circuit to be tested to the Testing Host 30. In accordance with an aspect of the invention, each server module 23 may be configured to have an associated Testing Host 30 to which it communicates via a TCP/IP socket connection. If not, then the logic flow returns to point A in FIG. 3. If there is a server module 23 available to identify the circuit that is to be tested to the Testing Host 30, then at step 248, the circuit ID is sent (e.g., via TCP/IP) from the manager module 22 to the server module 23 to perform testing and the logic flow returns to point A in FIG. 3.

Figure 5:
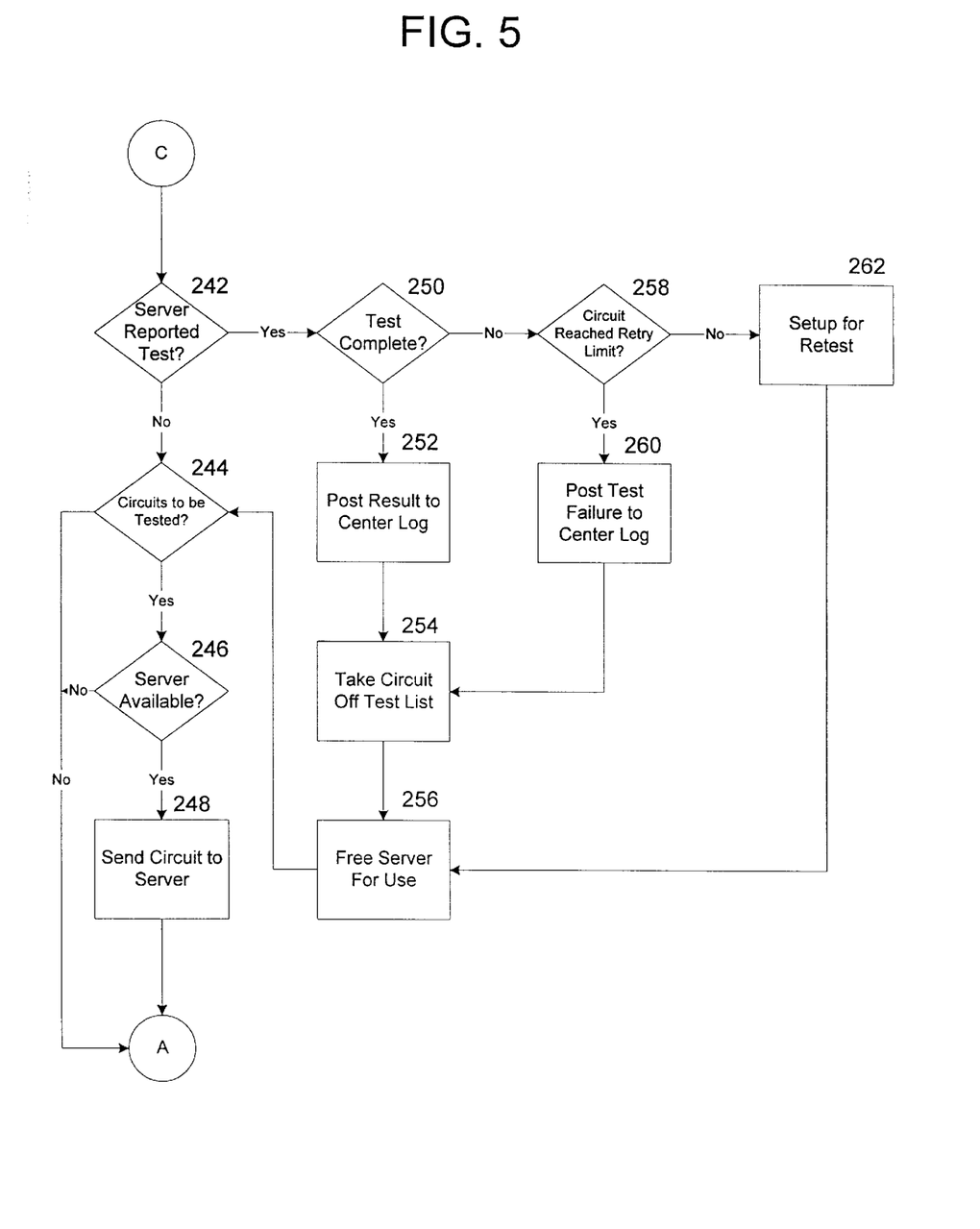

If at step 242 the server module 23 has reported the test results, then at step 250, the manager module 22 determines if the test is complete. If the test is complete, then at step 252, the results are posted to the service center log file, and the circuit is removed from the list of circuits (stored in the database 50) to be tested by the Testing Host 30. Also, the server module 23 coordinating the test for the circuit with the Testing Host 30 is freed for use by the manager module 22 for another circuit to be tested at step 256. The functional flow then jumps to step 244, where the logic flow continues as described above and the manager module 22 determines if there are additional circuits 15 to be tested (based on the testing list in the database 50 or in a memory in the platform on which the manager module 22 is executed).

If at step 250, the manager module 22 determines that the test is not complete, then at step 258 the manager module 22 determines if a predetermined retry limit has been reached. The retry limit is a value that may be set in the testing parameter configuration file. If the retry limit has been reached, then at step 260, a test failure condition is posted to the service center log file at step 260 and at step 254 the circuit is removed from the testing list in the database 50. The server module 23 is then freed for use to test another circuit at step 256 where the flow continues as described above. If at step 258 it is determined that the retry limit has not been reached, then at step 262, the test is setup for retesting (i.e., the circuit testing sequence is resubmitted by the server module 23 to the Testing Host 30 for the circuit to be tested). After step 259, logic flow proceeds to step 256 and continues as described above.

Referring again to FIG. 3, if at step 214 it is time to stop testing, the server module 23 is shutdown at step 216, and the manager module 22 determines at step 218 what special service centers have received test results. At step 220, the manager module 22 checks the special service center configuration file to determine how to notify service personnel (e.g., via E-mail) at the special service centers. At step 222, the manager module 22 sends the test results to the special service center in accordance with the information contained in the special service center configuration file and then logic flow returns to step 200 where the looping process begins again.

If at step 208, the manager module 22 determines that testing is not underway, then logic flows to step 210 to determine if it is time to begin testing. If it is not time to being testing, then logic flows back to step 200, where the looping process begins. If it is time to begin testing, then logic jumps to point D and step 204 in FIG. 6.

Figure 6:
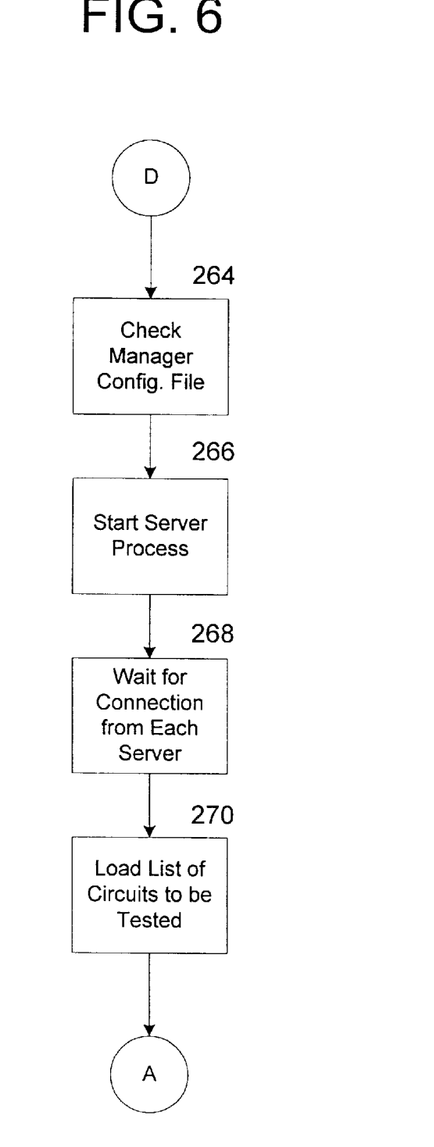

Referring to FIG. 6, at step 264 the manager module 22 checks the manager module configuration file to determine the number of server modules 23 to start. At step 266, the specified server modules 23 are started and the manager module 22 waits for a connection (e.g., TCP/IP socket) at step 268 from each of the server modules 23 started at step 266. At step 270, the list of circuits 15 to be tested is loaded by the manager module 22 from the database 50, and logic flows back to point A and step 200 in FIG. 3.

An exemplary flow chart of the operations and functions of the server module 23 of the MAIN process 25 is discussed below with reference to FIGS. 1 and 7–8.

The server module 23 receives test requests from the manager module 22 and indicates the circuits to be tested to the Testing Host 30 by sending the appropriate circuit IDS. The test results from the Testing Host 30 are parsed by the server module 23 and the circuit status (e.g., operational or faulty) is determined. If the special service center configuration file indicates a ticket should be generated for faulty circuits 15, the server module 23 connects to the WFA Host to create a trouble ticket. The server module 23 updates the database 50 with test results and removes the circuit from the database 50 if the circuit is determined to be in use by the customer. Also, the server module 23 informs the manager module 22 with a test completion indication or a test attempt indication.

Figure 7:
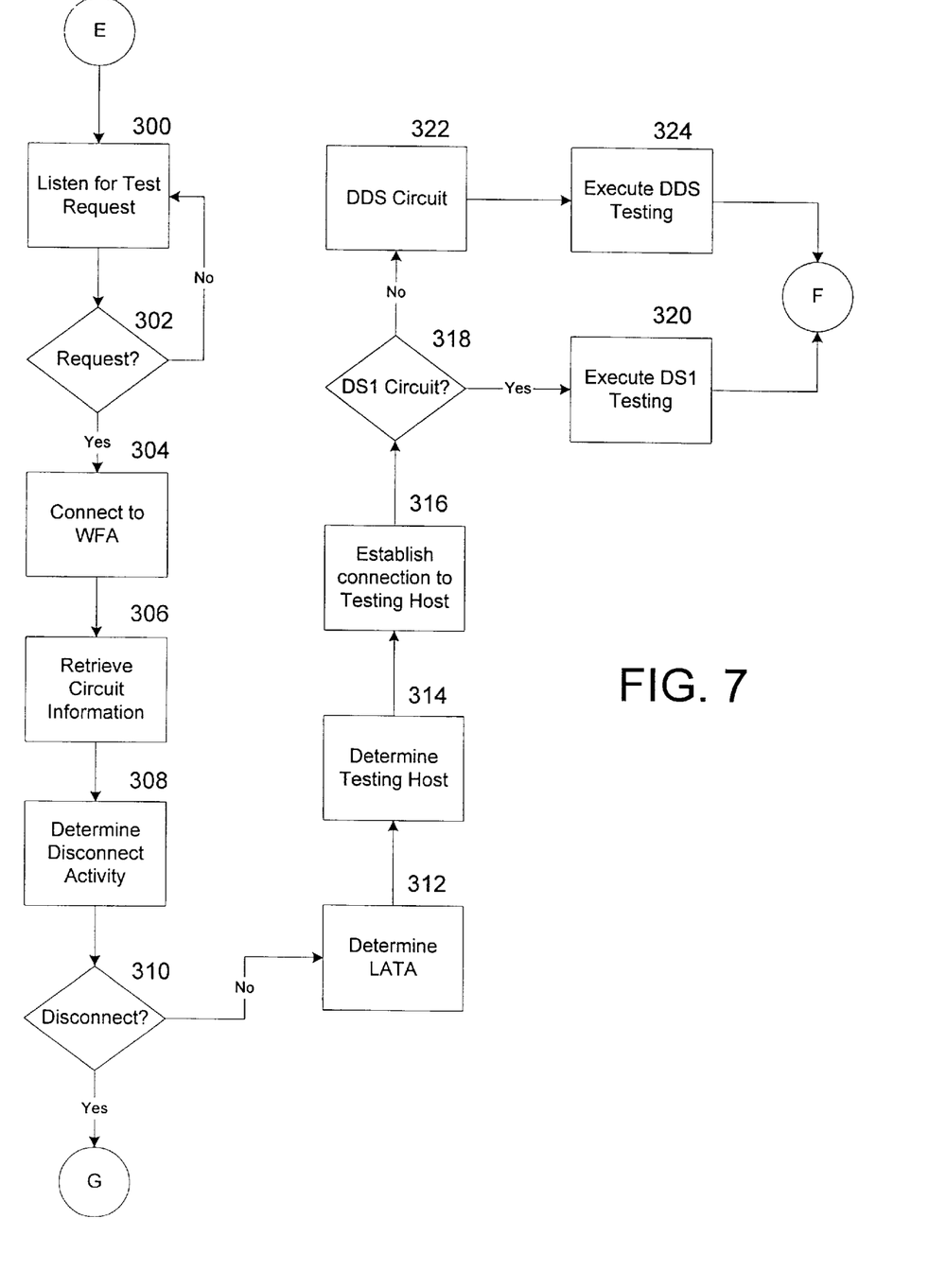
FIGS. 7–8 are exemplary flow charts of the processes and operations of a server module of the present invention.
Figure 8:
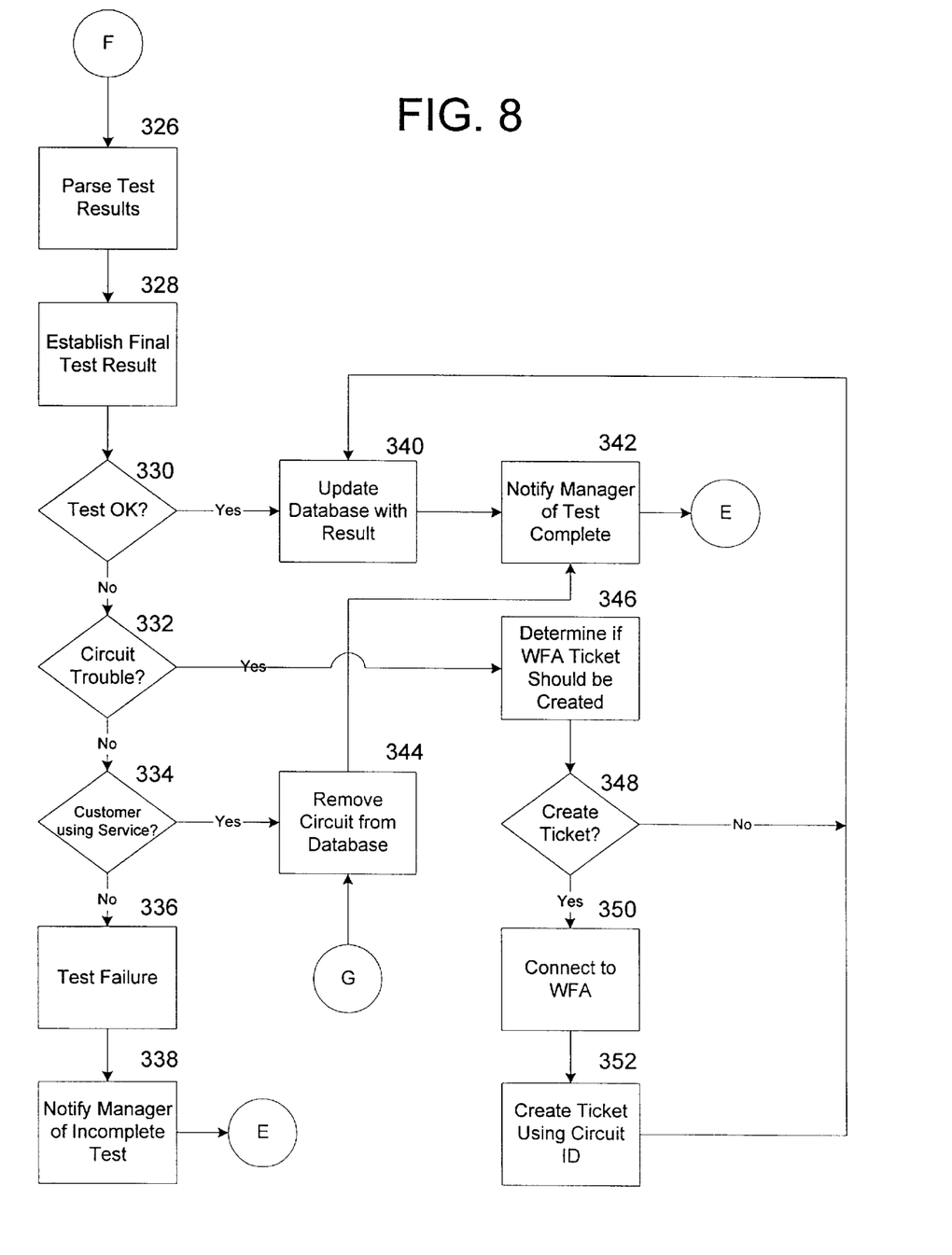

Referring now to FIGS. 7 and 8, a description of the logic flow of the processes and operations of the server module 23 according to an embodiment of the present invention will be provided. Referring now to FIG. 7, at step 300, the server module 23 waits for a test request from the manager module 22 (see step 248 in FIG. 5). If a request is received at step 302, then processing continues at step 304, otherwise processing loops back to step 300 to wait for a request.

If at step 302 a request containing the circuit ID is received, then at step 304, the server module 23 connects to the WFA Host 10 via the TCP/IP socket (or other network connection) and retrieves circuit history information (based on the circuit ID) at step 306 from the OSS History Measurement Data (OSSHMD) and the OSS Circuit History (OSSCHI) screens 13 using SNA HLLAPI calls. The OSSCHI screen 13 may be parsed at step 308 to determine if the service related to the circuit to be tested has been disconnected by the customer. The OSSCHI screen 13 contains customer history information, which includes whether the circuit is still active, or has been disconnected. If the server module 23 determines at step 310 that the customer has not disconnected the service related to the circuit to be tested (e.g., from the OSSCHI screen 13), then at step 312 the geographic region or Local Access and Transport Area (LATA) of the circuit to be tested is parsed from the OSSHMD screen 13. The region or LATA of the circuit is parsed in order to determine which Testing Host 30 will perform the tests on the circuit. From the information parsed at steps 306 and 312, the server module 23 determines which Testing Host 30 is to perform the tests at step 314, and establishes a connection to the Testing Host at step 316. The server module 23 then determines at step 318 what type of circuit is to be tested based on the value contained within the circuit ID field. For example, at step 318 the server module 23 may determine if the circuit to be tested is a DS1 circuit, and if so, a DS1 testing sequence (e.g., Hekimian Command Language Interpreter (HCLI) Dialog) may be executed on the Testing Host 30 at step 320. The HCLI Dialog may be determined in advance to define the tests or sequence of tests to be performed by the Testing Host 30 on the circuits 15. As noted above, the DS1 testing sequence may include industry-standard bit error rate tests, such as QRSS and 0000, and utilize loopback testing equipment such as smart jack and master unit, available from Teltrand Inc., of St. Charles, Ill. If it is determined at step 318 that the circuit is not a DS1 circuit, then at step 322, the server module 23 may analyze or assume that the circuit is another type of circuit, such as a DDS circuit, and execute the DDS testing sequence (e.g., HCLI Dialog) on the Testing Host 30 for each circuit to be tested. The DDS testing sequence may include industry-standard bit error rate tests, such as 2047 and stress patterns 1–5, and test a customer premise repeater, a midspan repeater, and Office Channel Unit (OCU). The OCU is the last loopable component in the circuit and powers the facility (e.g., stand within Central Office 60). After completing both the DS1 and DDS testing sequence, the logic flow jumps to point F and step 326 in FIG. 8.

As shown in FIG. 8, the test results are parsed into the appropriate database record fields (described above) by the server module 23 at step 326, and a final test result is established at step 328. During the testing sequence, the Testing Host 30 may send test-related data to the server module 23. This data is parsed and placed in the database 50 such that the final test results may be established. The final test results may include a determined fault condition in a circuit or an indication that the circuit passed the test. If the testing sequence is determined to have completed without error at step 330, then the database 50 is updated with the result at step 340 and the manager module 22 is notified (see step 242 in FIG. 5) at step 342. Thereafter, control returns to point E and step 300 in FIG. 7. If at step 330 the test results indicate that the circuit did not pass or did not complete successfully, then at step 332 the server module 23 determines if the circuit under testing is in error. If so, the server module 23 determines, at step 346, based on the special service center configuration file, if a WFA ticket reporting the error should be generated. If at step 348 a ticket is to be created, then at step 350 the server module 23 connects to the WFA Host 10 via the TCP/IP socket and creates a ticket at step 352 based on the circuit ID. Otherwise, control proceeds from step 348 to step 340 where the database is updated to indicate the test result, similar to that noted above.

If at step 332 the server module 23 determines that the circuit is not in error, then the server module 23 determines if the customer is using the service. If the customer is using the service, the circuit is removed from the database at step 344, the manager module 22 is notified at step 342 and logic flow returns to point E and step 300 in FIG. 7. If the customer is not utilizing the service, then the server module 23 determines that the test is incomplete or has failed at step 336, and notifies the manager module 22 (see step 242 in FIG. 5) at step 338. Logic flow then proceeds to point E and step 300 in FIG. 7.

Referring again to FIG. 7, if at step 310 the customer has disconnected the service related to the circuit to be tested, then logic flow proceeds to point G and step 354 in FIG. 8, where at step 354 the circuit is removed from the database. Control then flows frorg step 354 as described above.

The features and aspects of the present invention may be utilized independently or in combination with other systems or features for various type of environments. For example, the present invention may be utilized as part of a digital circuit analysis and testing system. Such a system may include the features disclosed in the following U.S. provisional applications: Attorney docket number V15483, entitled "USER INTERFACE AND SYSTEM TO FACILITATE TELEPHONE CIRCUIT MAINTENANCE AND TESTING", in the names of William. R. Jones et al., filed Mar. 31, 1997; and Attorney Docket Number V15481 entitled "APPARATUS AND METHOD FOR MONITORING PROGRESS OF CUSTOMER GENERATED TROUBLE REPORTS", in the names of David H. Bollinger et al., filed Mar. 31, 1997, the disclosures of which are expressly incorporated herein by reference in their entireties. Such a digital circuit analysis and testing system may provide an end user with the ability to test newly installed digital circuits, existing digital circuits, issue tickets for circuits determined to be faulty, and track the issued tickets until resolution of the fault.

While the invention has been described with reference to several exemplary embodiments, it is understood that the words which have been used herein are words of description and illustration, rather than words of limitations. Changes may be made, within the purview of the disclosure, as presently stated and as amended, without departing from the scope and spirit of the invention in its aspects. For example, the database table records may include additional fields to record information related to circuit testing. In addition, the OQS feed may be parsed by the parse module for information in addition to the Circuit Line Orders. Also, additional WFA screens may be accessed to retrieve other information related to the circuit to be tested and to populate the database records.

What is claimed:

1. A system which remotely tests a communications circuit, said system outputting circuit condition information related to said communications circuit to service center personnel, said system comprising:

a control system which controls said system, said control system receiving status information related to said communications circuit from a tracking system;

a testing system which performs a test operation on said communications circuit in response to a test request from said control system, said testing system determining said circuit condition information and providing a test completion indicator to said control system;

a notification system which provides notification of said circuit condition information, wherein said control system sends said test request to said testing system based on said status information from said tracking system and instructs said notification system to provide notification of said circuit condition information upon receipt of said test completion indicator;

wherein said control system extracts a list of communications circuits to be tested by said testing system, said list of said communications circuits and said circuit condition information for each of said communications circuits being stored in a database, said control system accessing said database and transferring a communications circuit ID of each communications circuit to be tested to said testing system; and wherein if said control system determines that a customer has accessed or disconnected said communications circuit, said test operation is inhibited and said database is updated to remove said communications circuit from said list.

2. The system according to claim 1, wherein if said test completion indicator for said communications circuit indicates that said test operation has not completed, said control system retries said test operation a predetermined number of times, and if said control system has retried said test operation said predetermined number of times, said database is updated to remove said communications circuit.

3. The system according to claim 1, wherein said circuit condition information includes at least one of: a circuit level order; a name of a service center; a region in which said test operation was performed; a circuit ID format; circuit identification; a time value indicating when said communications circuit was first received by said system; a time of a last test access; a time of a last completed test; a time when said communications circuit is determined to be in use; and results of a last test performed on said communications circuit.

4. The system according to claim 2, wherein said control system controls said system in accordance with at least one configuration file, said at least one configuration file comprising information indicating at least one of: a number of servers to be used; a platform to run on; a starting time; an ending time; a type of testing performed and reported to a service center; whether trouble tickets should be generated in response to a detected fault; a type of report to generate; a work pool that a function level code is to be assigned; and notification parameters.

5. The system according to claim 1, wherein said control system comprises:

a management module which manages events occurring within said system and communicates with said tracking system and said database;

a parse module which extracts circuit condition information input from said tracking system, said parse module communicating said circuit condition information to said management system; and a server module which communicates with said testing system, said server module communicating said test completion indictor to said management module, wherein said server module initiates said test operation, said test operation being executed with said testing system, and wherein said communications circuits comprise digital telephony circuits.

6. The system according to claim 5, wherein said list of said communications circuits and said circuit condition information for each of said communications circuits is stored in said database, and wherein said management module accesses said database and transfers said communications circuit to be tested to said testing system.

7. The system according to claim 6, wherein said test operation is inhibited if said server module determines that a customer has accessed or disconnected said communications circuit and said database is update to remove said communications circuit.

8. The system according to claim 7, wherein if said test completion indicator for said communications circuit indicates that said test operation has not completed, said server module retries said test operation a predetermined number of times, and if said server module has retried said test operation said predetermined number of times, said database is updated to remove said communications circuit.

9. The system according to claim 8, wherein said circuit condition information includes at least one of: a circuit level order; a name of said service center; a region in which said test operation was performed; a circuit ID format; circuit identification; a time value indicating when said communications circuit was first received by said system; a time of a last test access; a time of a last completed test; a time when said communications circuit is determined to be in use; and results of a last test performed on said communications circuit.

10. The system according to claim 8, wherein said control system controls said system in accordance with at least one configuration file, said at least one configuration file comprising information relating to at least one of: a number of servers to be used; a platform to run on; a starting time; an ending time; a type of testing performed and reported to a service center; whether trouble tickets should be generated in response to a detected fault; a type of report to generate; a detected input; a work pool that a function level code is to be assigned; and notification parameters.

11. The system according to claim 5, wherein said testing system comprises a REACT 2001 Remote Test Operational Support System, said tracking system comprises a Work Force Administration Operational Support System, and said digital telephony circuits comprise Dataphone Digital Service and Digital Service, Level 1, circuits.

12. The system according to claim 1, wherein said notification system notifies service center personnel by at least one of electronic mail, pager and trouble tickets issued by said tracking system.

13. A system which remotely tests a communications circuit, said system outputting circuit condition information related to said communications circuit, said system comprising:

control means for controlling said system, said control means receiving status information related to said communications circuit from a tracking system;

testing means for performing a test operation on said communications circuit in response to a test request, said testing means determining said circuit condition information and providing a test completion indicator to said control means;

notifying means for providing notification of said circuit condition information, wherein said control means sends said test request to said testing means based on said status information from said tracking system and instructs said notifying means to provide notification of said circuit condition information upon receipt of said test completion indicator;

wherein said control means access a list of communications circuits to be tested by said testing means, said list of said communications circuits and said circuit condition information for each of said communications circuits being stored in a database, said control means accessing said database and transferring a communications circuit ID of each communications circuit to be tested to said testing means; and wherein said test operation is inhibited if said control means determines that a customer has accessed or disconnected said communications circuit and said database is updated to remove said communications circuit from said list.

14. The system according to claim 13, wherein if said test completion indicator for said communications circuit indicates that said test operation has not completed, said control means retries said test operation a predetermined number of times, and if said control means has retried said test operation said predetermined number of times, said database is updated to remove said communications circuit.

15. The system according to claim 14, wherein said circuit condition information includes at least one of: a circuit level order; a name of a service center; a region in which said test operation was performed; a circuit ID format; a circuit identification; a time value indicating when said communications circuit was first received by said system; a time of a last test access; a time of a last completed test; a time when said communications circuit is determined to be in use; and results of a last test performed on said communications circuit.

16. The system according to claim 14, wherein said control means controls said system in accordance with at least one configuration file, said at least one configuration file including information relating to at least one of: a number of servers; a platform to run on; a starting time; an ending time; a type of testing performed and reported to a service center; whether trouble tickets should be generated in response to a detected fault; a type of report to generate; a work pool that a function level code is to be assigned; and notification parameters.

17. The system according to claim 13, said control means comprising:

means for managing events occurring within said system, said managing means communicating with said database and said tracking system;

means for extracting circuit condition information input from said tracking system, said extracting means communicating said circuit condition information to said managing means; and means for communicating with said testing means, said communicating means communicating said test completion indicator to said managing means, wherein said communicating means initiates said test operation, said test operation being executed by said testing means, and wherein said communications circuits comprise digital telephony circuits.

18. The system according to claim 17, wherein said list of said communications circuits and said circuit condition information for each of said communications circuits is stored in said database, and wherein said managing means accesses said database and transfers said communications circuit to be tested to said testing means.

19. The system according to claim 18, wherein if said test completion indicator for said communications circuit indicates that said test operation has not completed, said communicating means retries said test operation a predetermined number of times, and if said communicating means has retried said test operation said predetermined number of times, said database is updated to remove said communications circuit.

20. The system according to claim 19, wherein said circuit condition information includes at least one of: a circuit level order; a name of a service center; a region in which said test operation was performed; a circuit ID format; a circuit identification; a time value indicating when said communications circuit was first received by said system; a time of a last test access; a time of a last completed test; a time when said communications circuit is determined to be in use; and results of a last test performed on said communications circuit.

21. The system according to claim 19, wherein said control means controls said system in accordance with at least one configuration file, wherein said at least one configuration file includes at least one of: a number of servers to be used; a platform to run on; a starting time; an ending time; a type of testing performed and reported to a service center; whether trouble tickets should be generated in response to a detected fault; a type of report to generate; a detected input; a work pool that a function level code is to be assigned; and notification parameters.

22. The system according to claim 17, wherein said testing means comprises a REACT 2001 Remote Test Operational Support System, said tracking system comprises a Work Force Administration Operational Support System, and said digital telephony circuits comprise Dataphone Digital Service and Digital Service, Level 1, circuits.

23. The system according to claim 13, wherein said notifying means notifies service center personnel by at least one of electronic mail, pager and trouble tickets issued by said tracking system.

24. A method for testing a communications circuit with a system which is capable of remotely testing communications circuits, said system comprising a testing system, a database and a notification system, said method comprising:

receiving a list of communication circuits to be tested by said system, said list being received from a tracking system;

storing circuit information associated with each communications circuit to be tested in said database;

testing, based on said list received from said tracking system, each communications circuit to be tested using a test operation performed by said testing system;

determining said circuit information based on said test operation;

providing a test completion indicator;

notifying service center personnel of said circuit information upon receipt of said test completion indicator;

wherein said step of testing further comprises:

inhibiting said test operation if a customer has accessed or disconnected said communications circuit to be tested;

updating said database, when a customer has accessed or disconnected said communications circuit to be tested, to remove said communications circuit from said list; and updating a log file at a service center that contains information related to said communications circuit to include said circuit information.

25. The method according to claim 24, said step of testing further comprising:

retrying said test operation a predetermined number of time if said test completion indicator for said communications circuit indicates that said test operation has not completed; and updating said database to remove said communications circuit from said list if said testing system has retried said test operation said predetermined number of times.

26. The method according to claim 24, wherein said step of notifying includes providing notification to service center personnel by at least one of electronic mail, pager and trouble tickets issued by said tracking system.

* * * * *